R. S. BRYANT.
VEHICLE WHEEL.
APPLICATION FILED OCT. 14, 1913.
1,160,254.
Patented Nov. 16, 1915.
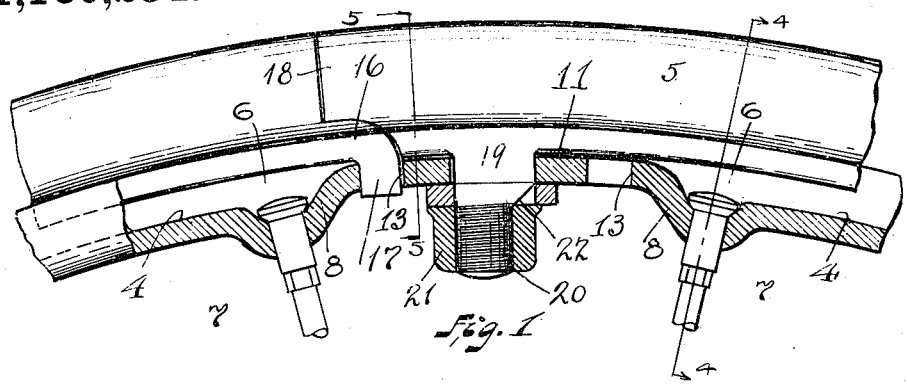
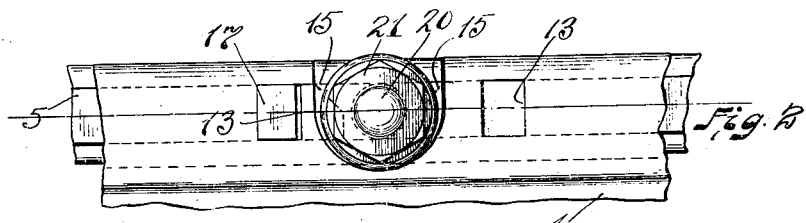
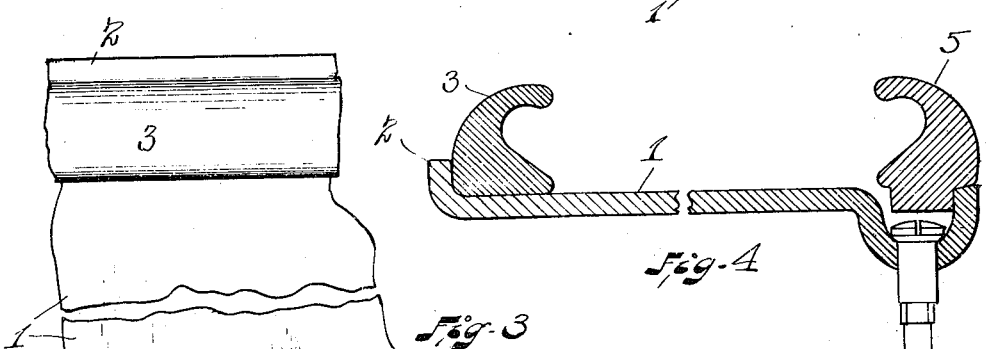
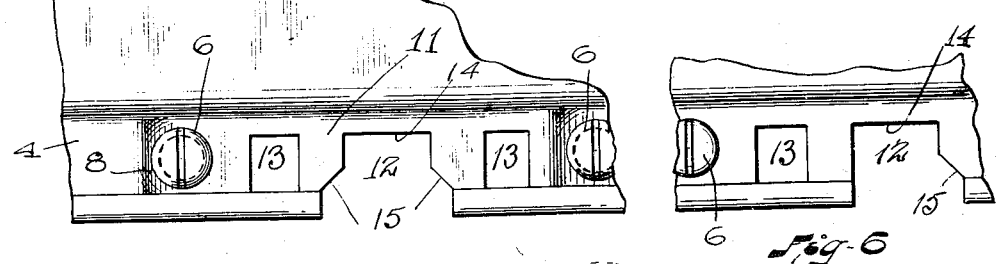
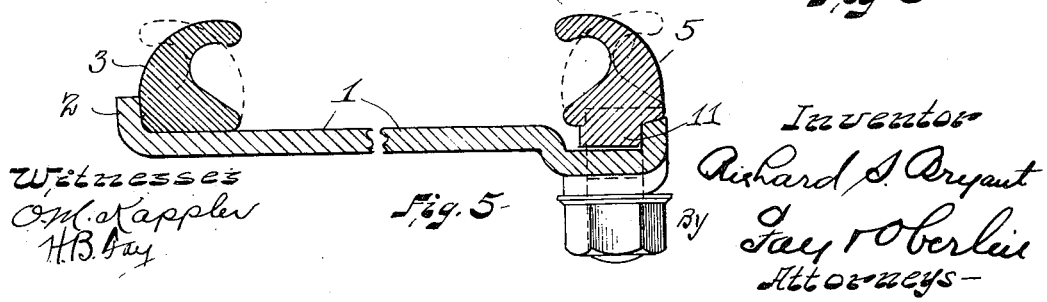
Witnesses
O. M. Kappler
H. B. Fay
Inventor
Richard S. Bryant
By Fay & Oberlin
Attorneys

UNITED STATES PATENT OFFICE.

RICHARD S. BRYANT, OF CLEVELAND, OHIO, ASSIGNOR TO THE STANDARD WELDING COMPANY, OF CLEVELAND, OHIO, A CORPORATION OF OHIO.

VEHICLE-WHEEL.

1,160,254.  Specification of Letters Patent.  Patented Nov. 16, 1915.

Application filed October 14, 1913. Serial No. 795,076.

*To all whom it may concern:*

Be it known that I, RICHARD S. BRYANT, a citizen of the United States, and a resident of Cleveland, county of Cuyahoga, and State of Ohio, have invented a new and useful Improvement in Vehicle-Wheels, of which the following is a specification, the principle of the invention being herein explained and the best mode in which I have contemplated applying that principle, so as to distinguish it from other inventions.

In the utilization of tire-supporting rims with detachable flanges on wheels having wire spokes, I have found it desirable to make certain modifications in the form of the rim as heretofore used on wooden spoke wheels. At the same time I have devised improved locking means for securing the detachable flange in place on the rim, such last-named means being equally adapted for use on rims in either wood or wire spoke wheels.

Having in mind the foregoing objects, the present invention, then, consists of the means hereinafter fully described and particularly pointed out in the claims.

The annexed drawing and the following description set forth in detail certain mechanism embodying the invention, such disclosed means constituting, however, but one of the various mechanical forms in which the principle of the invention may be used.

In said annexed drawing:—Figure 1 is a part side elevation and part section of my improved rim construction with the detachable flange shown in place; Fig. 2 is a bottom plan view of the same; Fig. 3 is a top plan view of the rim by itself; Fig. 4 is a transverse section of such rim and flange taken on the line 4—4, Fig. 1; Fig. 5 is a similar transverse section of the rim and flange shown in Fig. 1, but taken on the plane indicated by the line 5—5, in such figure; and Fig. 6 is a plan view of a modification.

The type of rim construction, to which the present improvements relate, is that in which the rim 1 is provided along its one edge or side with a permanent flange 2 either adapted to directly engage with the corresponding side of the tire shoe, or else, as illustrated in Figs. 4 and 5, to serve as an abutment for a separable ring 3, which is designed to thus engage with the tire. Where such a separable ring is employed, it may be, if desired, of the reversible type of construction adapted to coöperate either with a clencher, or a straight-sided tire. Along the other edge or side of the rim is formed a depression, or groove 4 that encircles such rim and is adapted to receive a split detachable ring or flange 5 which is designed to coöperate with the other side of the tire and secure the same in place. The outer wall of said groove lies flush with or below the outer face of the rim and such split ring is adapted to interlock with this wall when said ring is fitted in the groove, as will be readily understood.

The present improvements are concerned more particularly with the form of the groove 4 designed to receive such split detachable ring, and with the means for locking the ends of the ring to the rim. Claims to said locking means, however, have been required to be divided out, and so have been presented in a separate application filed by me July 22, 1915, Serial No. 41,263.

As illustrated in Figs. 1, 3 and 4, the same groove in which such split detachable ring is held, is utilized to receive the heads 6 of the corresponding series of wire spokes 7. To this end the groove, instead of being formed with a flat bottom as heretofore, is made with a rounded bottom so that a space is left below the flat, *i. e.*, cylindrical, inner face of the ring to accommodate the heads of the spokes. Depressions 8, inclined in the proper direction, are furthermore made in the bottom of the groove to provide seats for such heads.

At the point in the periphery of the rim where it is desired to provide means for locking to said rim the ends of the split ring 5, the portion of the bottom of said groove, lying between two adjacent spoke ends, is raised to present a flat bearing surface 11, as shown in Figs. 1 and 5, against which surface the under faces of such ends of the ring are adapted to contact. This raised, flattened portion of the groove bottom is then provided with a lateral notch 12 of the shape clearly shown in Fig. 3, and with two rectangular recesses or apertures 13, one on each side of such notch. The notch comprises a rectangular seating portion 14 with flaring or beveled end walls 15 extending outwardly therefrom to the edge of the rim.

The one end of the split ring is formed with a projection 16 terminating in a downwardly turned lug 17 of the lateral form clearly appearing in Fig. 1, and of a cross sectional form adapted to substantially fit either one of the rectangular apertures 13 in the bottom of the groove. As shown in Figs. 1 and 2, such lug is in place in the aperture to the left of the notch, but in the reverse position of the ring it would be fitted in the aperture on the right. The other end of the ring terminates in a projection 18 of a form complementary to that presented by the projection 16 just described, such second end being, in effect, undercut so as to overlap the projection on the first end, as clearly illustrated in Fig. 1. Said second end is furthermore provided with a downwardly turned lug 19, either integral therewith or rigidly attached thereto and having a cross-sectional form adapted to fit the inner rectangular portion 14 of the notch 12 when the end is in proper place. This lug has its outer end 20 threaded to receive a nut 21, as shown in Fig. 1, and it also includes an intermediate portion 22 with a beveled face adapted to engage with the end wall of the notch.

From the foregoing description it will be seen that the lug 19 on such second end of the split ring 5 may be easily forced laterally into place by engagement of its outer portion 20 with the bevel 15 in the end wall of the notch itself; while, upon pressing downwardly, having regard to the axis of the wheel, the intermediate beveled face 22 on the lug itself assists in forcing the lug into its final locking position, drawing up, or pulling, on the ring incidentally to doing so, until such end of the ring engages the first end, as shown in Fig. 1.

The manner of using my improved construction of rim should be fully evident from the foregoing description and from the construction and operation of its several parts. As indicated, it is not necessary, where it is not desired to reversibly use the detachable split ring, that two apertures 13 should be provided, or that the notch 12 should be doubly beveled, for, as shown in Fig. 6, in such case a single aperture 13 will suffice and the notch need be beveled only at one end, namely that farthest removed from such aperture.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. The combination with a tire-supporting rim having a groove along its one edge, the bottom of such groove being transversely concave; of a split ring adapted detachably to fit in such groove and interlock with the outer wall thereof, the inner face of said ring, when thus fitted in said groove, being spaced from the bottom thereof so as to provide a clearance, substantially as described.

2. The combination with a tire-supporting rim having a groove along its one edge, the bottom of such groove being transversely concave; of a split ring adapted detachably to fit in such groove and interlock with the outer wall thereof, the inner face of said ring, when thus fitted in said groove, being spaced from the bottom thereof so as to provide a clearance, substantially as described; and means on the ends of said ring adapted to engage said rim and lock said ring thereto, the portion of such groove-bottom adjacent to the point of engagement of said ends being raised so as to contact with the inner face of said ring.

3. The combination with a tire-supporting rim having a groove along its one edge, the bottom of such groove being transversely concave; of a split ring adapted detachably to fit in such groove and interlock with the outer wall thereof, the inner face of said ring, when thus fitted in said groove, being spaced from the bottom thereof so as to provide a clearance, substantially as described; and inwardly directed lugs on the adjacent ends of said ring adapted to engage said rim and lock said ring thereto, the portion of such groove-bottom adjacent to the point of engagement of such lugs being raised and flattened so as to contact with the inner face of said ring.

4. As an article of manufacture, a tire-supporting rim having a groove along its one edge, the bottom of such groove being transversely concave in the main but having a raised portion adapted to contact with and form a seat for a split ring or side flange fitted in said groove.

5. As an article of manufacture, a tire-supporting rim having a groove along its one edge, the bottom of such groove being transversely concave save at one point in the periphery of the wheel where such groove-bottom is raised so as to be adapted to contact with the inner face of a split ring or side flange fitted in said groove.

6. As an article of manufacture, a tire-supporting rim having a groove along its one edge, the bottom of such groove being transversely concave in the main but having a raised portion adapted to contact with and form a seat for a split ring or side flange fitted in said groove, such raised portion being formed to interlock with the ends of such side flange.

Signed by me, this 8th day of October, 1913.

RICHARD S. BRYANT.

Attested by—
D. S. DAVIES,
A. L. GILL.